United States Patent
Tunc et al.

(10) Patent No.: US 11,029,444 B2
(45) Date of Patent: Jun. 8, 2021

(54) PIPE TRACKING SYSTEM FOR DRILLING RIGS

(71) Applicant: Schlumberger Technology Corporation, Sugar Land, TX (US)

(72) Inventors: Gokturk Tunc, Houston, TX (US); Shunfeng Zheng, Katy, TX (US); Vishwanathan Parmeshwar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 306 days.

(21) Appl. No.: 14/946,390

(22) Filed: Nov. 19, 2015

(65) Prior Publication Data

US 2016/0291201 A1 Oct. 6, 2016

Related U.S. Application Data

(60) Provisional application No. 62/140,034, filed on Mar. 30, 2015.

(51) Int. Cl.
*G01V 15/00* (2006.01)
*E21B 17/00* (2006.01)
(Continued)

(52) U.S. Cl.
CPC ............ *G01V 15/00* (2013.01); *E21B 17/006* (2013.01); *E21B 41/00* (2013.01); *E21B 47/04* (2013.01); *E21B 7/04* (2013.01); *E21B 21/08* (2013.01); *E21B 44/00* (2013.01); *E21B 44/02* (2013.01); *E21B 44/04* (2013.01); *G06K 19/00* (2013.01)

(58) Field of Classification Search
None
See application file for complete search history.

(56) References Cited

U.S. PATENT DOCUMENTS

| 4,468,959 A | * | 9/1984 | Roberts | ................... E21B 19/20 73/152.01 |
| 5,202,680 A | * | 4/1993 | Savage | ................. E21B 17/006 175/40 |

(Continued)

FOREIGN PATENT DOCUMENTS

| FR | 1243946 A2 | * | 9/2002 | ............. G01V 15/00 |
| GB | 2247904 A | * | 3/1992 | ........... E21B 17/006 |

(Continued)

OTHER PUBLICATIONS merriam-webster.com definition of "paint".*

*Primary Examiner* — Catherine T. Rastovski
*Assistant Examiner* — Leonard S Liang

(57) ABSTRACT

A system for a drilling rig, a computer-readable medium, and a method for tracking an oilfield tubular. The method includes applying a tag to the oilfield tubular, the tag including a readable tag identifier, determining a physical parameter of the oilfield tubular, storing data representing the physical parameter in association with the tag identifier in a database, reading the tag identifier from the tag applied to the oilfield tubular, prior to deploying the oilfield tubular into a wellbore, and generating a pipe tally comprising data representing a plurality of oilfield tubulars, including the oilfield tubular, connected together and deployed into the wellbore using a drilling rig.

20 Claims, 6 Drawing Sheets

(51) Int. Cl.
  *E21B 41/00* (2006.01)
  *E21B 47/04* (2012.01)
  *E21B 44/00* (2006.01)
  *G06K 19/00* (2006.01)
  *E21B 44/02* (2006.01)
  *E21B 44/04* (2006.01)
  *E21B 21/08* (2006.01)
  *E21B 7/04* (2006.01)

(56) References Cited

U.S. PATENT DOCUMENTS

| | | | | |
|---|---|---|---|---|
| 5,485,148 | A * | 1/1996 | Tseng | G01F 1/66 340/10.41 |
| 5,491,637 | A * | 2/1996 | Kraemer | G05B 19/4183 700/115 |
| 5,521,366 | A * | 5/1996 | Wang | G06K 7/10564 235/454 |
| 6,333,699 | B1 * | 12/2001 | Zierolf | E21B 17/006 166/254.2 |
| 6,347,292 | B1 * | 2/2002 | Denny | E21B 17/006 702/188 |
| 6,604,063 | B2 * | 8/2003 | Denny | E21B 17/006 702/188 |
| 6,759,968 | B2 * | 7/2004 | Zierolf | E21B 17/006 166/250.01 |
| 7,014,100 | B2 * | 3/2006 | Zierolf | E21B 17/006 235/375 |
| 7,256,699 | B2 * | 8/2007 | Tethrake | G06K 19/041 340/10.1 |
| 7,303,120 | B2 * | 12/2007 | Beenau | G07C 9/257 235/380 |
| 7,654,464 | B2 * | 2/2010 | Babine | G06Q 10/087 235/487 |
| 8,228,260 | B2 * | 7/2012 | Huffer | H01Q 11/08 343/895 |
| 8,378,841 | B2 * | 2/2013 | Stevens | G06Q 10/08 166/250.01 |
| 8,463,664 | B2 * | 6/2013 | Griggs | G06Q 10/087 705/28 |
| 8,464,946 | B2 * | 6/2013 | Mackenzie | E21B 17/006 235/385 |
| 9,140,823 | B2 * | 9/2015 | Christiansen | E21B 17/006 |
| 9,462,357 | B2 * | 10/2016 | Westick | H04Q 9/00 |
| 9,727,814 | B2 * | 8/2017 | Casden | G06K 19/07728 |
| 9,784,094 | B2 * | 10/2017 | Limbacher | E21B 47/04 |
| 2002/0014966 | A1 * | 2/2002 | Strassner, II | E21B 17/006 340/572.1 |
| 2003/0028356 | A1 * | 2/2003 | Denny | G06K 19/07758 702/188 |
| 2003/0156033 | A1 * | 8/2003 | Savage | G06K 19/04 340/572.8 |
| 2005/0230110 | A1 * | 10/2005 | Ellison | E21B 44/00 166/255.1 |
| 2007/0236339 | A1 * | 10/2007 | Kantrowitz | G01V 15/00 340/10.52 |
| 2009/0188675 | A1 * | 7/2009 | Bloom | G06K 19/0723 166/381 |
| 2009/0248307 | A1 * | 10/2009 | Barrow | E21B 47/04 702/6 |
| 2010/0245075 | A1 * | 9/2010 | Stevens | G06Q 10/08 340/539.1 |
| 2012/0133526 | A1 * | 5/2012 | Christiansen | G01V 15/00 340/854.6 |
| 2012/0212326 | A1 * | 8/2012 | Christiansen | G06K 7/10009 340/10.1 |
| 2013/0285829 | A1 | 10/2013 | Pacheco et al. | |
| 2013/0341039 | A1 * | 12/2013 | Flusche | E21B 15/003 166/380 |
| 2013/0341040 | A1 * | 12/2013 | Flusche | E21B 33/068 166/380 |
| 2014/0006227 | A1 | 1/2014 | Griggs et al. | |
| 2015/0114634 | A1 * | 4/2015 | Limbacher | E21B 47/04 166/255.1 |
| 2015/0285034 | A1 * | 10/2015 | Frisby | E21B 34/14 166/373 |
| 2016/0194950 | A1 * | 7/2016 | Zheng | E21B 19/20 73/152.04 |
| 2017/0114633 | A1 * | 4/2017 | Maylin | E21B 47/122 |
| 2020/0102795 | A1 * | 4/2020 | Zheng | E21B 19/24 |

FOREIGN PATENT DOCUMENTS

| | | | | |
|---|---|---|---|---|
| GB | | 2377584 A | * 1/2003 | F16L 1/11 |
| GB | | 2463588 A | * 3/2010 | E21B 33/134 |
| NO | WO | 0079239 A1 | * 12/2000 | E21B 17/006 |
| WO | WO | 2012115717 A2 | * 8/2012 | B82Y 30/00 |
| WO | | 2013165943 A2 | 11/2013 | |

* cited by examiner

PIPE TRACKING SYSTEM FOR DRILLING RIGS

CROSS-REFERENCE TO RELATED APPLICATIONS

This application claims priority to U.S. Provisional Patent Application having Ser. No. 62/140,034, which was filed on Mar. 30, 2015. The entirety of this priority application is incorporated herein by reference.

BACKGROUND

In a drilling operation, keeping track of the length and order of drill pipes deployed into the well may facilitate maintaining operations safety, and may permit close correlation of downhole measurements. This process may be done manually, e.g., with a rig operator conducting manual measurements of each pipe and the driller manually entering the details of each pipe into a spreadsheet.

Recently, there have been efforts to provide a more automated system for tracking pipes. The implementation of these systems is often motivated by the desire to create persistent data about each individual pipe. For example, these systems may be implemented to track how many times a pipe has been run into a well or otherwise track its life cycle progression. Accordingly, such automated systems generally rely on tagging the pipes in such a way that the identifier may be read multiple times, spanning potentially several runs into a wellbore.

Various ways of doing this have been implemented, including securely attaching ruggedized radiofrequency identification (RFID) tags to the pipes, or even embedding the tags within the pipe. While these solutions may be suitable in some instances, challenges remain present. For example, ruggedized tags may be costly, and may still be damaged or fail in the harsh wellbore environment, and/or the ferrous metal pipes may interfere with the ability to read the tags. Further, embedding RFID tags within the pipe may be costly, and may weaken the pipe and/or the connection between two pipes.

SUMMARY

Embodiments of the disclosure may provide a method for tracking an oilfield tubular. The method includes applying a tag to the oilfield tubular, the tag including a readable tag identifier, determining a physical parameter of the oilfield tubular, storing data representing the physical parameter in association with the tag identifier in a database, reading the tag identifier from the tag applied to the oilfield tubular, prior to deploying the oilfield tubular into a wellbore, and generating a pipe tally comprising data representing a plurality of oilfield tubulars, including the oilfield tubular, connected together and deployed into the wellbore using a drilling rig.

Embodiments of the disclosure may also a system for a drilling rig. The system includes one or more processors, and a memory system including one or more non-transitory, computer-readable media storing instructions that, when executed by at least one of the one or more processors, cause the system to perform operations. The operations include applying a tag to the oilfield tubular, the tag including a readable tag identifier, determining a physical parameter of the oilfield tubular, storing data representing the physical parameter in association with the tag identifier in a database, reading the tag identifier from the tag applied to the oilfield tubular, prior to deploying the oilfield tubular into a wellbore, and generating a pipe tally including data representing a plurality of oilfield tubulars, including the oilfield tubular, connected together and deployed into the wellbore using a drilling rig.

Embodiments of the disclosure may further provide a non-transitory, computer-readable medium storing instructions that, when executed by one or more processors of a computing system, causing the computing system to perform operation. The operations include applying a tag to the oilfield tubular, the tag including a readable tag identifier, determining a physical parameter of the oilfield tubular, storing data representing the physical parameter in association with the tag identifier in a database, reading the tag identifier from the tag applied to the oilfield tubular, prior to deploying the oilfield tubular into a wellbore, and generating a pipe tally including data representing a plurality of oilfield tubulars, including the oilfield tubular, connected together and deployed into the wellbore using a drilling rig.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
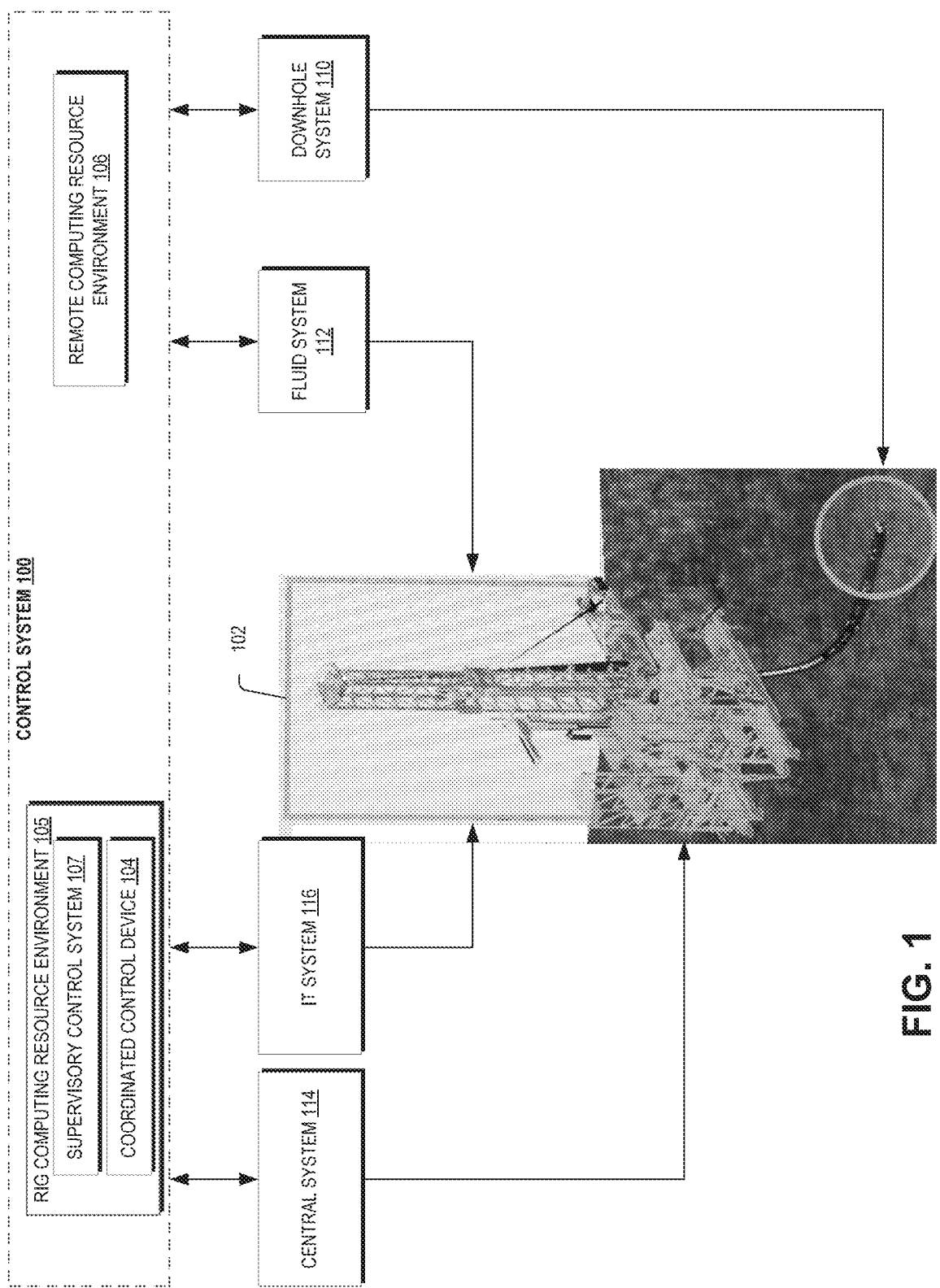
FIG. 1 illustrates a schematic view of a drilling rig and a control system, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection).

Further, the drilling rig 102 may include various systems with different sensors and equipment for performing operations of the drilling rig 102, that may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. In some embodiments, the drilling rig 102 may include an information technology (IT) system 116. The downhole system 110 may include, for example, a bottomhole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, draw-works, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, etc.). An embodiment of the control system 100 that is unified, may, however, provide control over the drilling rig 102 and its related systems (e.g., the downhole system 110, fluid system 112, and/or central system 114).

Figure 2:
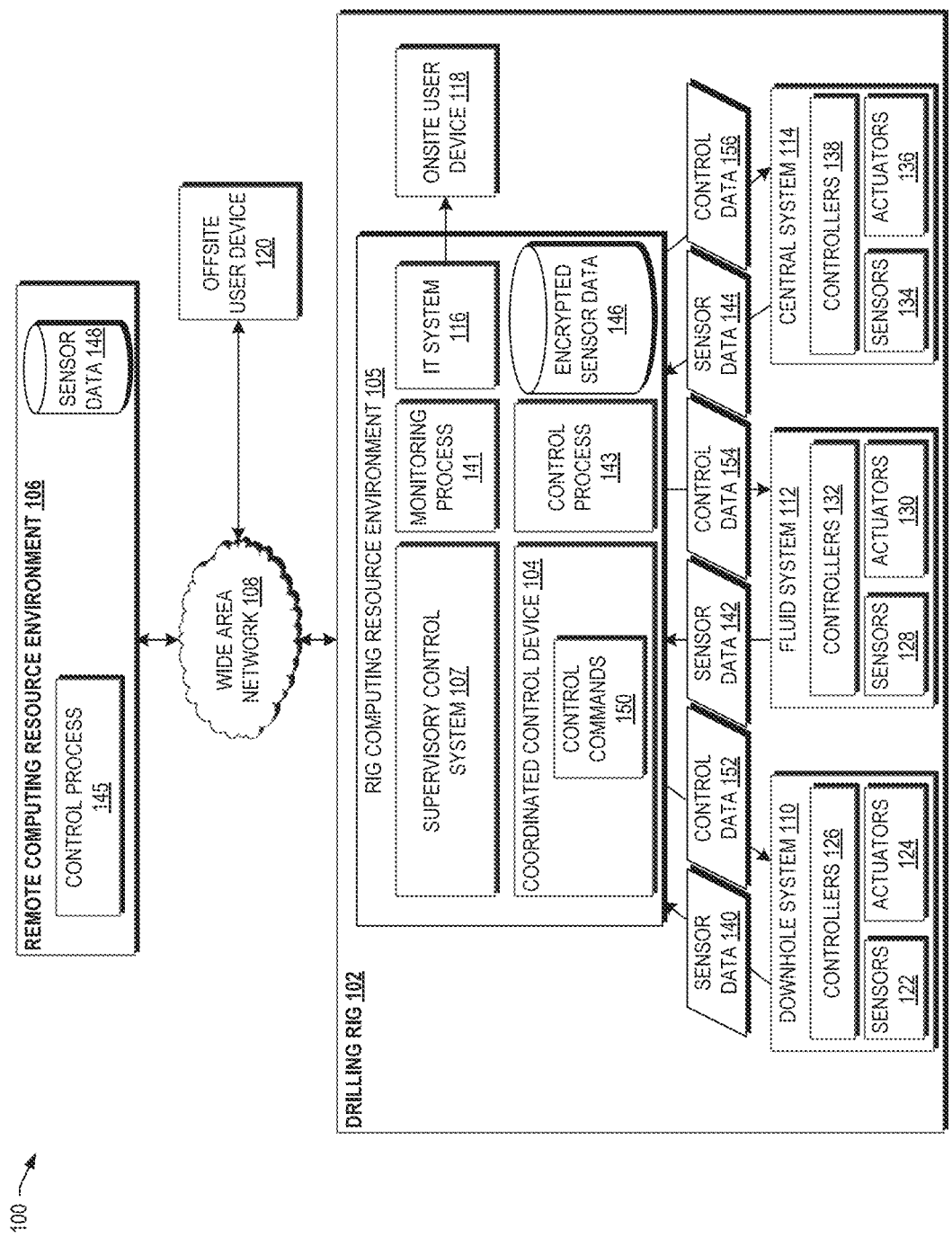
FIG. 2 illustrates a schematic view of a drilling rig and a remote computing resource environment, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The systems of the drilling rig 102 may include various sensors, actuators, and controllers (e.g., programmable logic controllers (PLCs)). For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data at the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. The variation in measurements at different locations over time may be used to determine equipment performance, system performance, scheduled maintenance due dates, and the like. For example, slip status (e.g., in or out) may be acquired from the sensors and provided to the rig computing resource environment 105. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands.

In some embodiments, control of the various systems of the drilling rig 102 may be provided via a three-tier control system that includes a first tier of the controllers 126, 132, and 138, a second tier of the coordinated control device 104, and a third tier of the supervisory control system 107. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The encrypted sensor data 146 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a thin client configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 156 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. A user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 3:
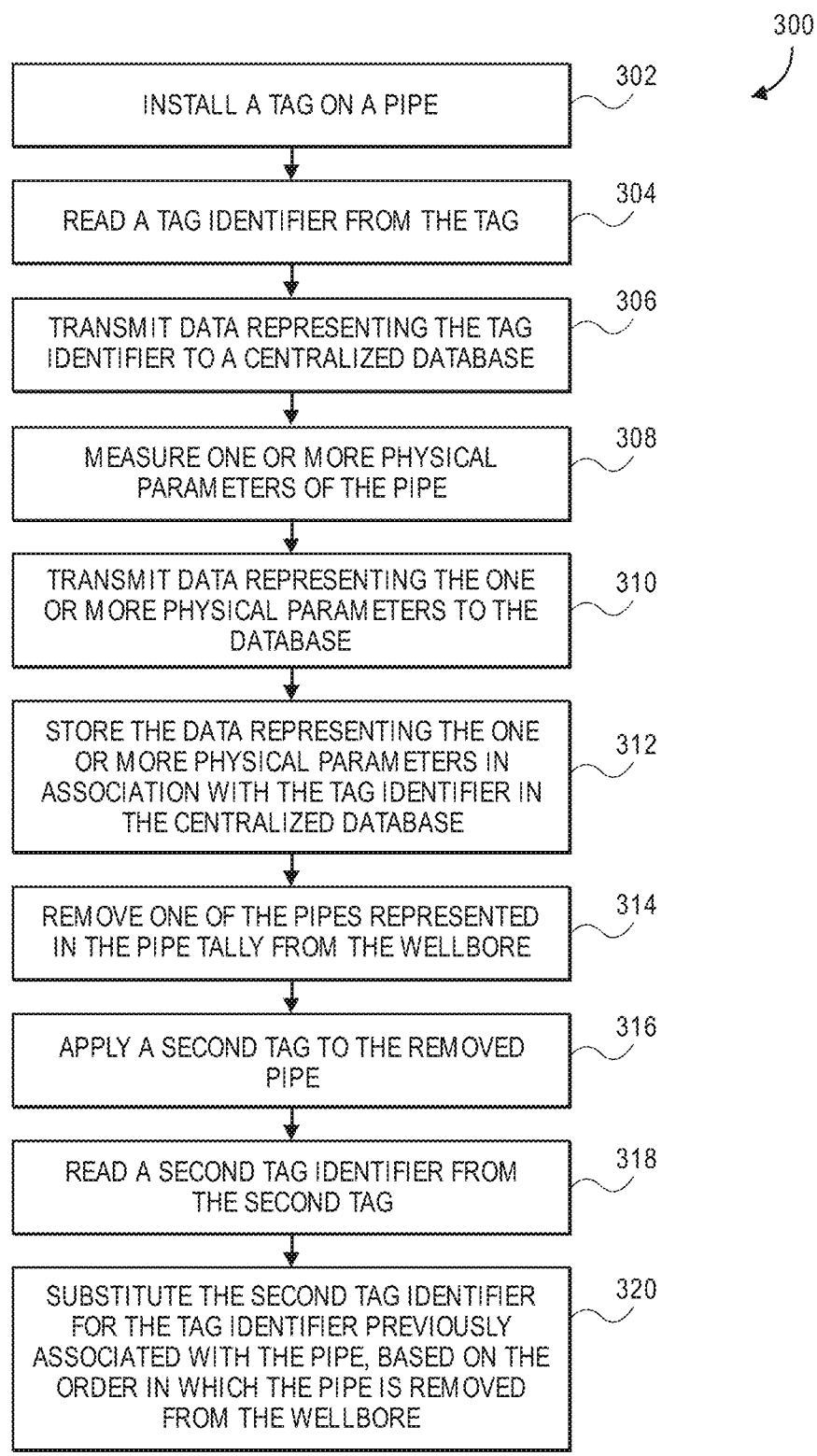
FIG. 3 illustrates a flowchart of a method for tracking an oilfield tubular in a well, according to an embodiment.

FIG. 3 illustrates a flowchart of a method 300 for tracking an oilfield tubular, e.g., from the drilling rig into the well, according to an embodiment. The oilfield tubular may be any type of oilfield tubular, for example, drill pipe, casing, bottom hole assembly (BHA), and the like. For purposes of illustration, the method 300 is described herein with reference to drill pipe, but it will be appreciated that this is merely an example. Further, the method 300 may be implemented using an embodiment of the rig control system discussed and described above, but, in other embodiments, may be implemented using any other type of controller, whether local or remote.

Figure 4:
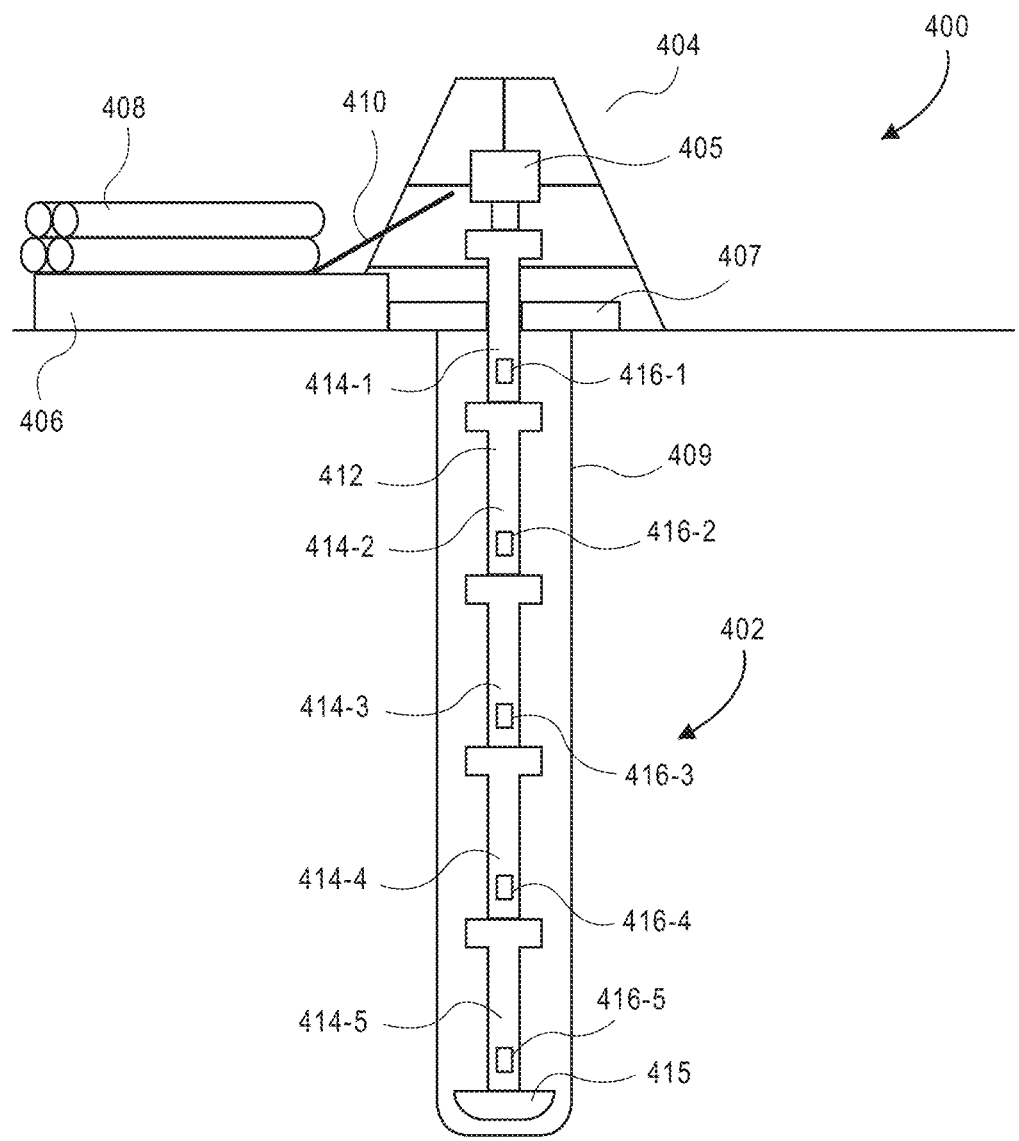
FIG. 4 illustrates a schematic view of a drilling rig and a well, according to an embodiment.

FIG. 4 illustrates a simplified, schematic view of a drilling rig 400 and a well 402, according to an embodiment. The rig 400 may generally include a surface structure 404 (e.g., a derrick), as well as a pipe rack 406. The surface structure 404 may include drilling equipment such as, for example, a top drive 405. The top drive 405 may be raised and lowered using a drawworks, travelling block, crown block, etc. Further, the surface structure 404 may include a rig floor 407, which may span a top of the wellbore 409 of the well 402. The surface structure 404 may also include one or more structures configured to bear a weight of a drill string (or another tubular string), such as slips, thereby allowing joints of tubular to be added or removed from the drill string. Other components may also be positioned at or below the rig floor 407, such as rotating control devices, blowout preventers, valves, manifolds, etc.

In the illustrated embodiment, one or more lengths ("joints") of pipe 408 may be positioned on the pipe rack 406, horizontally (as shown), vertically, or in any other orientation. A catwalk 410 may extend between the pipe rack 406 and the surface structure 404, and may facilitate maneuvering joints of pipe 408 from the rack 406 to the top drive 405. A pipe handler (not shown in FIG. 4) may be used to pick up the pipe 408 from the catwalk 410 (or V-Door) and move it for connection to the top drive 405. In another embodiment, a pipe handler may be used to pick up the pipe 408 from the pipe rack 406 and move the pipe 408 for connection to the top drive 405.

A drill string 412 may extend downward from the rig floor 407. The drill string 412 may include one or more joints of pipe (five shown: 414-1, 414-2, 414-3, 414-4, 414-5), which may have been received from the pipe rack 406, connected together, end-on-end, and lowered into the wellbore 409. The drill string 412 may also include a bottom-hole assembly (BHA) 415, e.g., at the distal (as shown, lower) extent of the drill string 412. The BHA 415 may include a drill bit and any other devices configured to bore into the earth and form the wellbore 409.

Tags 416-1, 416-2, 416-3, 416-4, 416-5 may be applied to the respective pipes 414-1, 414-2, 414-3, 414-4, 414-5. The tags 416-1, 416-2, 416-3, 416-4, 416-5 may be readable and, when read, may provide a "unique" identifier to the reader. The term "unique" generally refers to maintaining different identifiers within a single drill string 412, so as to avoid two pipes 414-1, 414-2, 414-3, 414-4, 414-5 being associated with same tag identifier. In other embodiments, as will be described below, the tags 416-1, 416-2, 416-3, 416-4, 416-5 may be applied to the pipe 408 in the pipe rack 406 and/or during transition thereof to the top drive 405 via the catwalk 410, and may be removed prior to running the pipe 408 into the wellbore 409.

The tags 416-1, 416-2, 416-3, 416-4, 416-5 may each be a radiofrequency identification (RFID) tag. In other embodiments, each tag 416-1, 416-2, 416-3, 416-4, 416-5 may be a bar code, a quick response (QR) code, or any other tag capable of being applied to a pipe and conveying an identifier, or other information, to a processor. In yet another embodiment, the tags 416-1, 416-2, 416-3, 416-4, 416-5 may be one of a plurality of engraved or magnetized marks. Further, the tags 416-1, 416-2, 416-3, 416-4, 416-5 may not be ruggedized, and may be configured to be rendered inoperative (i.e., removed, destroyed, or otherwise non-readable) when exposed to the downhole environment.

Referring again to FIG. 3, and considering the pipes 408 individually, e.g., prior to running into the wellbore 409, the method 300 may include applying or installing a tag on one of the pipes 408, as at 302. Installing the tag at 302 may include, for example, applying a tag each time a pipe 408 is moved from the pipe rack 406 to the catwalk 410. In other embodiments, the tag may be applied at any time prior to the pipe 408 being deployed into the wellbore 409.

Since the tags may be configured to be rendered inoperative in the downhole environment, the method 300 may include reading a tag identifier from the tag prior to deploying the pipe 408 into the wellbore 409, as at 304. For example, the tag reader may be located at the catwalk 410, one or near the rig floor 407, at or near the top drive 405 (e.g., in or on the mast), e.g., at or near the pipe handler, on a separate structure that may form part of the surface structure 404, or anywhere else on the drilling rig 400.

Another embodiment may include providing a removable tag, which may be removed from a first pipe 408 and applied to a second pipe 408 thereafter. In some examples, such removable tags may be rewritable, such that a unique identifier may be employed for the respective pipes 408, while using a reduced number of tags.

In another embodiment, applying or installing the tag may include magnetizing a portion of the tubular, painting a readable tag on the tubular, or engraving the tubular (e.g., by embedding another metal into the wall of the tubular). Such tags may be sufficiently rugged to remain intact in the wellbore 409, and may thus be reused in association with the same pipe 408 after removal therefrom from the wellbore 409.

Data representing the identifier associated with and read from the tag may be stored in a database for use in a pipe tally, as at 306. The database may be centralized and/or distributed. The database may store a list of tag identifiers that are read, in addition to an order in which they were read. Since the tags may be read during the deployment process, this may serve to establish an order of the pipes in the wellbore within the pipe tally. Further, the method 300 may include measuring one or more physical parameters of the pipe, as at 308, and transmitting data representing the physical parameters to the database, as at 310.

For example, as the pipe 408 is moved from the catwalk 410 to the V-door to be racked on the monkey board, a length measurement device may be used to measure the length of the pipe. The measurement may be from end to end of the pipe (or stand of pipes), or it may be from the box end to the shoulder of the pin end. Other physical parameters may also or instead be measured, such as diameter (inner, outer, or both), wall thickness, cylindricity, thread measurements, etc. These measurements may be associated, in the database, with the tag (e.g., using the tag identifier thereof) installed on the pipe 408.

A processor may execute an application that receives the information from the tag reader when the pipe 408 is moved to the catwalk 410, or when the pipe 408 is removed from the pipe rack 406 and connected to the top drive 405, including the tag identifier, the data representing the physical parameter, and/or the like. The data representing the one or more physical parameters for the pipe may be stored in association with the data representing the tag identifiers applied or installed (at least temporarily) on the individual pipe, as at 312. Using this information, an automated pipe tally may be built to track the pipe (e.g., number of joints, and total length of the drilling string) used to drill the well. Accordingly, referring to FIG. 4, the first tag read may be tag 414-5, as it was applied to the first pipe run 414-5. The physical characteristic(s), e.g., length, of this pipe 414-5 may be stored first. Each subsequent pipe 414-4, 414-4, 414-3, 414-2, 414-1 (etc.) may have its associated tag 416-4, 416-4, 416-3, 416-2, 416-1 read. The identifier read therefrom may be stored in the database along with the physical characteristic(s), in a manner that preserves the order in which the tag identifiers were acquired. In an embodiment, this may be an ordered list. In other embodiments, other database structures may be employed.

In this way, during the drilling of the wellbore 409, the database can facilitate tracking the precise length, inner diameter, etc., of individual pipes 414-1, 414-2, 414-3, 414-4, 414-5 in the wellbore 409. With the tag information associated with the pipe, the database can further be used to track the usage of each of the individual pipes 414-1, 414-2, 414-3, 414-4, 414-5 with regard to its fatigue cycles, running time, loading conditions (e.g. jarring loads), etc. Since within a tubing string, each individual pipe may experience different fatigue damage depending on its location related to the wellbore (e.g., wellbore dog leg severity), by tagging each individual pipe and tracking its corresponding depth in the wellbore, precise fatigue life tracking can be accomplished. Further, since the location of a particular one of the pipes 414-1, 414-2, 414-3, 414-4, 414-5 may be calculated, in embodiments in which length is tracked, the precise length of the drill string 412 may be tracked.

In some cases, the tag identifiers may be unique, e.g., tags are not re-used, or, if they are re-used, they may be rewritable and have a different identifier programmed into the tags prior to reuse. In other embodiments, tag identifiers may be re-used, and the tags may be associated with second identifiers in the system, to avoid data collisions between two pipes upon which the same tag was applied.

In an embodiment, at some point, it may be desired to remove one or more of the pipes 414-1, 414-2, 414-3, 414-4, 414-5 from the wellbore 409. The method 300 may thus include removing one of the pipes (e.g., the pipe 414-1), as represented in the pipe tally, out of the wellbore 409, as at 314. Such removal may be repeated one or more times for drill pipe; however, for casing, the casing may be set in place and may not be removed. Various other types of oilfield tubulars may or may not be removable. This may include lifting the pipe 414-1 using the top drive 405 and breaking out the connection between the pipe 414-1 and the subjacent pipe 414-2. Before, during, or after breaking out the connection, since the first tag may be inoperative (e.g., removed, destroyed, etc.), a second tag may be applied to the pipe 414-1, as at 316. The "second" tag identifier (e.g., the tag identifier associated with) the second tag may be read, as at 318. Then, the second tag identifier may be used to replace the tag identifier previously associated with the pipe, based on the order in which the pipe 414-1 is removed from the well 402, as at 320. Thus, the information about the physical characteristic(s) of the pipe 414-1 in the database may be associated with the second identifier rather than the previous identifier (although, the previous identifier may be retained without departing from the scope of the present disclosure).

Since the order in which the tag identifiers are read may be known from the database, the order in which the pipes 414-1, 414-2, 414-3, 414-4, 414-5 are removed from the wellbore 409 may be employed to link the pipes 414-1, 414-2, 414-3, 414-4, 414-5 to their stored physical characteristic(s). Thus, once the new tag identifier is read, the database may substitute in the second identifier for the identifier previously associated with the removed pipe (in this example, pipe 414-1). Then, the next pipe 414-2 may be removed, and its new second tag identifier may be associated with the physical characteristic of the second-to-last pipe run into the wellbore 409, and so on as each pipe is removed in reverse sequence to the order in which they were deployed into the wellbore 409. The second tag may or may not be the same type of tag as the original tag.

Figure 5:
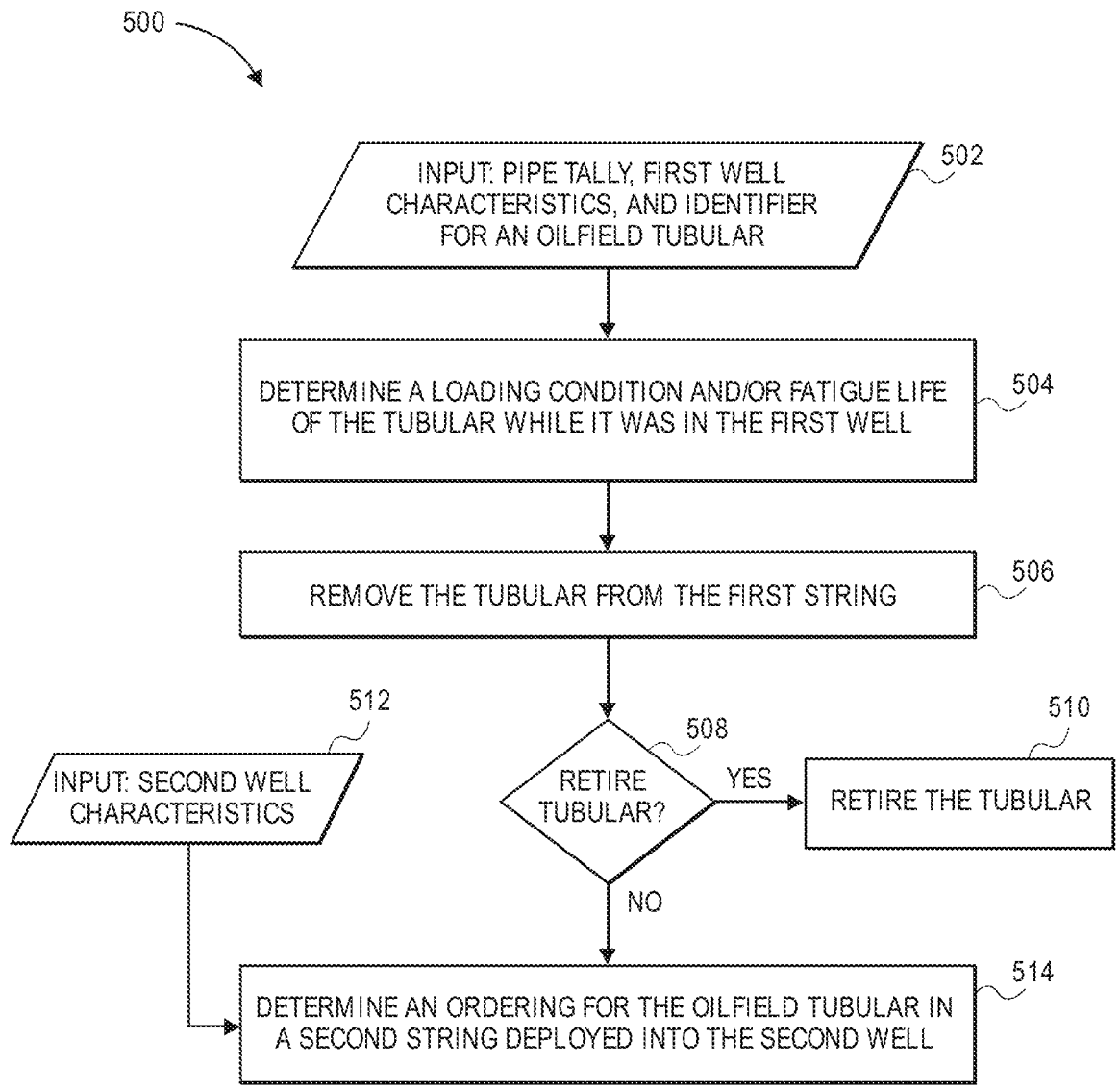
FIG. 5 illustrates a flowchart of another method for tracking an oilfield tubular in a well, according to an embodiment.

FIG. 5 illustrates another method 500 for tracking an oilfield tubular, according to an embodiment. The method 500 may obtain, as input, the pipe tally, e.g., as generated using the method 300, as at 502. As mentioned above, the pipe tally may provide information showing an order and, for example, a depth of the pipes in the well. In this case, the well is a "first" well; however, this naming convention is merely employed to distinguish the well being discussed from another or "second" well, that will be discussed later. No other conclusions should be drawn based on this naming convention. The method 500 may also receive as input at 502 one or more first well characteristics. These well characteristics may include, for example, geometry of the first well (e.g., kickoff depth, dog leg severity, drilling conditions/parameters, jarring loads, etc.). The method 500 may also include receiving an identifier for an oilfield tubular in question as part of the input at 502. The identifier may correspond to the particular oilfield tubular in the database, allowing access to information related thereto.

The method 500 may also include determining a loading condition and/or fatigue life of the tubular of the oilfield tubular while it was in the first well, as at 504. As noted above, in general, the useful life of the oilfield tubular, especially oilfield tubulars that are removable from the well (e.g., drill pipe) may not be constant. A variety of factors apart from simply the number of wells into which the tubular is deployed may come into play. Overall running time of the tubular may be considered. Further, each rotation of a tubular while it is in a deviated section of the well may apply a cyclic bending load on the tubular as the string turns, which may not be applied thereto when it is outside of the deviated wellbore section. This bending load may hasten the pipe reaching the end of its fatigue life. Additionally, a tubular that is added to a relatively short string may bear less tensile loading than a tubular added to a relatively long string. That is, in the former instance, the tubular may wind up at a greater depth in the well than in the latter instance. Further, if the tubular spends a greater amount of time in a horizontal section of the well, less tensile loads may be applied thereto. Such loading conditions may also prolong or reduce fatigue life. Furthermore, drilling parameters such as weight on bit, rate of penetration, rotation speed, etc. may affect fatigue life. Hydrostatic pressure within the wellbore at the different depths may also be considered. Indeed, a variety of other factors, which may be related to either or both of the position of the tubular in the string and the well characteristics may be considered in a fatigue analysis of the individual tubulars. These and other factors may thus be stored in the database and/or employed for making calculations related to the remaining fatigue life of the tubular.

At some point, the method 500 may include removing the tubular from the first string, e.g., by tripping out at least a portion of the tubular, as at 506. At some later time, it may be desired to run or extend another string into another, "second" well, and thus it may be desired to determine whether the oilfield tubular removed from the first string may be used in the second well.

The method 500 may thus include determining whether the oilfield tubular should be retired, as at 508. This may be conducted by determining whether there is remaining fatigue life in the oilfield tubular, such as comparing the loading conditions, timing, etc., experienced by the oilfield tubular to a threshold. If the oilfield tubular's loading conditions meet or exceeds the threshold, the oilfield tubular may be retired (e.g., discarded, repurposed, etc.), as at 510.

If the oilfield tubular is not to be retired, the method 500 may receive as input, at 512, one or more second well characteristics, into which the second string may be deployed. Using this input, as well as the fatigue life, past loading conditions, etc., of the oilfield tubular, the method 500 may determine where in the second string the oilfield tubular should be placed (e.g., ordering of the pipe in the pipe tally for the second string), as at 514. The ordering of the pipe tally, and particularly the order of the oilfield tubular by way of example therein, may then be determined such that, if the oilfield tubular is nearing the end of its fatigue life, it may be positioned where it will be loaded less (e.g., spend less time rotating in a curved portion of the wellbore), and if the oilfield tubular is relatively early in its fatigue life, it may be ordered in the second string to experience more severe loading. The oilfield tubular may then be run as part of the second string, e.g., while establishing a pipe tally, as described above with reference to the method 300.

Figure 6:
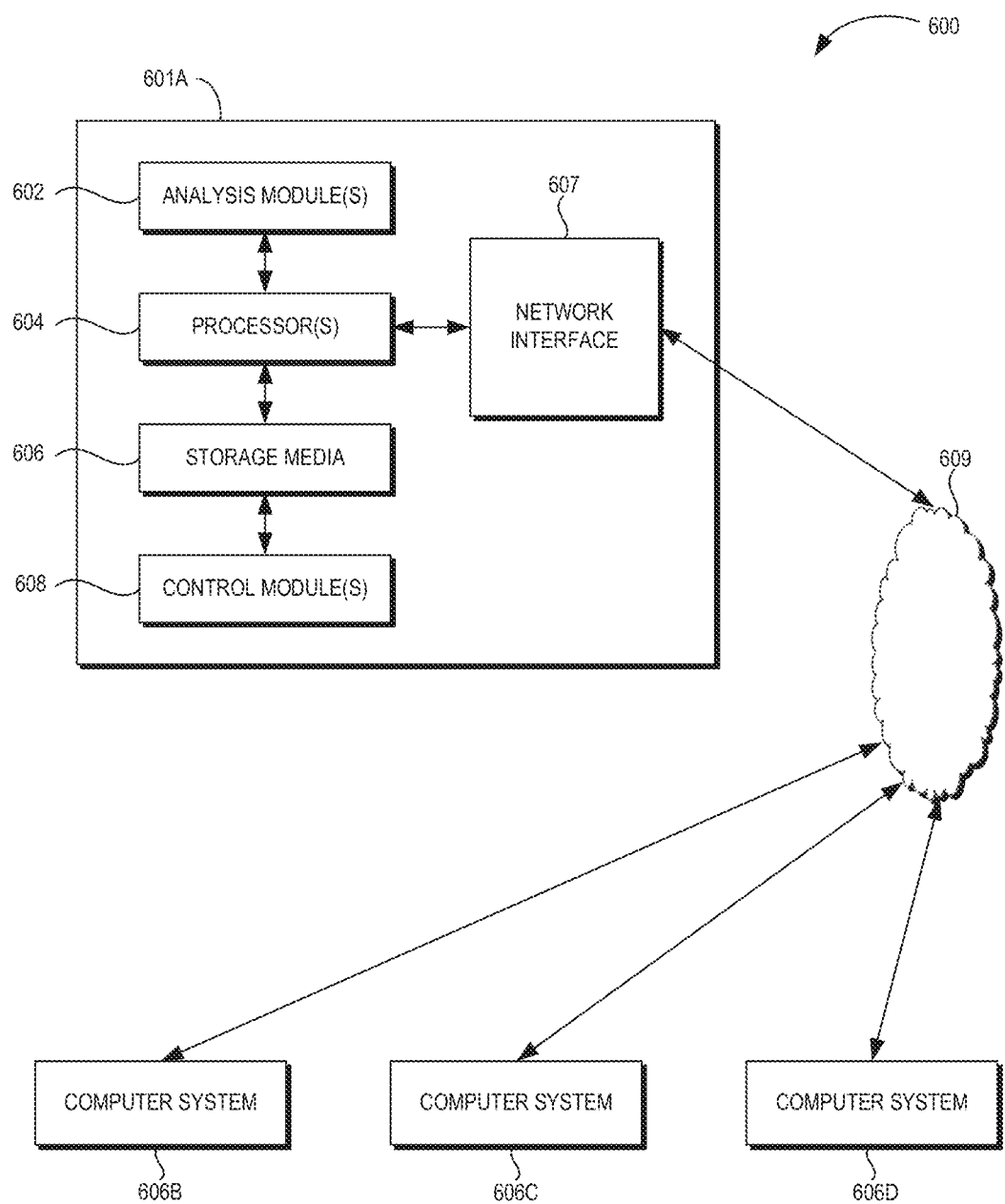
FIG. 6 illustrates a schematic view of a computing system, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 606B, 606C, and/or 606D (note that computer systems 606B, 606C, and/or 606D may or may not share the same architecture as computer system 601A, and may be located in different physical locations, e.g., computer systems 601A and 606B may be located in a processing facility, while in communication with one or more computer systems such as 606C and/or 606D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 600 contains one or more rig control module(s) 608. In the example of computing system 600, computer system 601A includes the rig control module 608. In some embodiments, a single rig control module may be used to perform some or all aspects of one or more embodiments of the methods disclosed herein. In alternate embodiments, a plurality of rig control modules may be used to perform some or all aspects of methods herein.

It should be appreciated that computing system 600 is only one example of a computing system, and that computing system 600 may have more or fewer components than shown, may combine additional components not depicted in the example embodiment of FIG. 6, and/or computing system 100 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the aspects of the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated. Additional information supporting the disclosure is contained in the appendix attached hereto.

What is claimed is:

1. A method for tracking an oilfield tubular, the method comprising:
    applying a non-ruggedized tag to the oilfield tubular, the non-ruggedized tag comprising a first tag identifier;
    determining a physical parameter of the oilfield tubular;
    storing data representing the physical parameter in association with the first tag identifier in a database;
    reading the first tag identifier from the non-ruggedized tag applied to the oilfield tubular, prior to deploying the oilfield tubular into a wellbore;
    deploying the oilfield tubular into the wellbore;
    generating a pipe tally comprising order data representing an order in which a plurality of oilfield tubulars, including the oilfield tubular, are connected together and deployed into the wellbore using a drilling fig;
    removing the oilfield tubular from the wellbore;
    applying a second tag to the oilfield tubular, after removing the oilfield tubular from the wellbore;
    reading a second tag identifier from the second tag; and
    replacing the first tag identifier with the second tag identifier in the database using the order data of the pipe tally.

2. The method of claim 1, wherein applying the non-ruggedized tag comprises applying the non-ruggedized tag as the oilfield tubular is being moved from a pipe rack to a top drive of the drilling rig.

3. The method of claim 1, further comprising:
removing the non-ruggedized tag from the oilfield tubular after reading the first tag identifier; and
deploying the oilfield tubular into the wellbore, after removing the non-ruggedized tag.

4. The method of claim 1, wherein reading the first tag identifier comprises reading the first tag identifier prior to connecting the oilfield tubular to the plurality of oilfield tubulars deployed into the wellbore.

5. The method of claim 1, wherein the non-ruggedized tag is rendered inoperative when the oilfield tubular is in the wellbore.

6. The method of claim 1, wherein the non-ruggedized tag comprises a radiofrequency identification tag, and wherein applying the non-ruggedized tag comprises adhering the non-ruggedized tag to the oilfield tubular, prior to attaching the oilfield tubular to the plurality of oilfield tubulars.

7. The method of claim 1, wherein applying the non-ruggedized tag comprises painting, magnetizing, or engraving a portion of the oilfield tubular.

8. The method of claim 1, wherein the oilfield tubular comprises a drill pipe.

9. The method of claim 1, further comprising determining a position of the oilfield tubular in the wellbore based on the order data of the pipe tally and a geometry of the wellbore, wherein the physical parameter comprises at least one parameter selected from the group consisting of: fatigue life, running time in the wellbore, and a loading condition of the oilfield tubular in the wellbore.

10. The method of claim 9, wherein the determining the physical parameter comprises calculating the physical parameter based at least in part on the position of the oilfield tubular in the wellbore.

11. The method of claim 10, further comprising selecting a respective order for the oilfield tubular in a subsequently formed drill string based on the fatigue life associated with the oilfield tubular.

12. The method of claim 9, further comprising:
comparing the fatigue life to a threshold; and
retiring the oilfield tubular when the fatigue life exceeds the threshold.

13. The method of claim 1, comprising:
storing the oilfield tubular with the second tag;
reading the second identifier from the second tag while the second tag is applied to the oilfield tubular to identify the oilfield tubular and to access the data representing the physical parameter prior to deploying the oilfield tubular into a second wellbore;
determining a position for the oilfield tubular within the second wellbore based on the data representing the physical parameter;
deploying the oilfield tubular to the position within the second wellbore; and
generating a second pipe tally comprising respective order data indicative of a respective order in which a respective plurality of oilfield tubulars, including the oilfield tubular, are connected together and deployed into the second wellbore.

14. The method of claim 13, wherein the physical parameter comprises a length, a diameter, a wall thickness, cylindricity, or a thread measurement.

15. The method of claim 14, comprising measuring the physical parameter as the oilfield tubular is moved from a pipe rack to a top drive, prior to deploying the oilfield tubular into the wellbore.

16. The method of claim 1, comprising:
remeasuring the physical parameter of the oilfield tubular after removing the oilfield tubular from the wellbore and prior to deploying the oilfield tubular into a second wellbore;
transmitting measurement data representing the remeasured physical parameter to the database; and
storing the second identifier in association with the transmitted measurement data in the database.

17. The method of claim 1, wherein the replacing the first tag identifier with the second tag identifier in the database using the order data of the pipe tally comprises locating the data representing the physical parameter in the database using the order data of the pipe tally and then storing the data representing the physical parameters in association with the second tag identifier in the database.

18. A method comprising:
applying a first tag on a pipe while moving the pipe from a pipe rack of a drilling rig to a catwalk of the drilling rig, wherein the first tag is configured to be rendered inoperative in a downhole environment of a well being constructed by the drilling rig; then
reading a first tag identifier from the first tag; then:
transmitting first tag data representing the read first tag identifier to a database;
storing the transmitted first tag data in the database;
measuring one or more physical parameters of the pipe;
transmitting measurement data representing the measured one or more physical parameters to the database; and
storing the transmitted measurement data in the database in association with the stored first tag data; then
automatically updating a pipe tally based on the stored first tag data and the stored measurement data associated with the stored first tag data, wherein the pipe tally comprises order data indicative of an order of the pipe and a plurality of additional pipes in the well; then
deploying the pipe into the downhole environment, thus rendering the first tag inoperable; then
performing an operation in the well while the pipe is in the downhole environment; then
removing the pipe from the well; then
applying a second tag on the pipe; then
reading a second tag identifier from the second tag; then
transmitting second tag data representing the read second tag identifier to the database; then
linking the transmitted second tag data to the stored measurement data that was previously associated with the first tag data based on the order data of the pipe tally; then
storing the transmitted second tag data in the database in association with the stored measurement data in the database.

19. A method comprising:
obtaining:
an automated pipe tally of a plurality of pipes in a first pipe string in a first well, wherein the automated pipe tally comprises an order of the plurality of pipes in the first pipe string, measured physical parameters of each pipe of the plurality of pipes, and a plurality of first identifiers each unique to a corresponding pipe of the plurality of pipes and associated with the measured physical parameters of that pipe; and characteristics of the first well, including geometry and drilling parameters of the first well;

then:

removing an oilfield tubular from the first pipe string, wherein the oilfield tubular is one of the pipes of the plurality of pipes;

applying a tag to the oilfield tubular after removing the oilfield tubular from the first pipe string, wherein the tag comprises a second identifier; and reading the second identifier from the tag;

linking the second identifier with the measured physical parameters of the oilfield tubular based on the order of the plurality of pipes in the first pipe string;

storing the second identifier in association with the measured physical parameters of the oilfield tubular in a database; and determining a remaining fatigue life of the oilfield tubular;

then, based on the determined remaining fatigue life, determining not to retire the oilfield tubular; and then determining a position at which to include the oilfield tubular in a second pipe string to be used in a second well, wherein determining the position is based on characteristics of the second well and the determined remaining fatigue life.

20. The method of claim 19, wherein the pipe tally is a first pipe tally and the method further comprises:

reading the second identifier from the tag while the tag is applied to the oilfield tubular to identify the oilfield tubular prior to deployment at the position in the second pipe string;

remeasuring at least one of the physical parameters of the oilfield tubular prior to the deployment at the position in the second pipe string;

transmitting measurement data representing the remeasured at least one of the physical parameters to the database; and storing the second identifier in association with the transmitted measurement data in the database; then deploying the oilfield tubular to place the oilfield tubular at the position in the second pipe string within the downhole environment;

automatically updating a second pipe tally based on the position in the second pipe string, the stored second identifier, and the stored measurement data.

* * * * *